United States Patent Office 3,778,390
Patented Dec. 11, 1973

3,778,390
HYDROLYTICALLY UNSTABLE POLYURETHANE FOAMS
Donald Aloysious Ulrich, Jr., Cincinnati, Ohio, assignor to The Procter & Gamble Company, Cincinnati, Ohio
No Drawing. Filed July 17, 1972, Ser. No. 272,594
Int. Cl. C08g 22/10, 22/44
U.S. Cl. 260—2.5 AN                   3 Claims

ABSTRACT OF THE DISCLOSURE

Water-disintegratable, sewerage disposable, polyurethane foams wherein the conventional polyol reactant is replaced in whole or in part with a hydrolytically unstable polyester polyol, said foams being especially adapted to use in personal hygienic articles.

BACKGROUND OF THE INVENTION

This invention relates to hydrophilic polyurethane foams and in particular to hydrophilic polyurethane foams which are hydrolytically unstable. The term "hydrolytically unstable" is employed to describe that property of the novel polyurethanes, herein disclosed, which permits their complete physical disruption by means of chemical hydrolysis when contacted with water under controlled conditions. Thus, the polyurethane foams of this invention are ideally suited for sewerage disposable products for personal hygienic care, such as diapers, catamenial devices, toweling, and mats. Other uses, such as surgical sponges, water-destructable casting and molding materials, and articles of containment which are self-destructable after use, will be readily apparent to those skilled in the art.

The art relative to the various urethane products: fibers, adhesives, coatings, elastomers, flexible and rigid foams, is quite extensive and readily available in the literature. An especially useful compendium of the art literature, which is hereby incorporated by reference, is the two volume work of J. H. Saunders and K. C. Frisch, "Polyurethanes: Chemistry and Technology" (Interscience Publishers).

In general, polyurethanes are resistant to hydrolytic degradation, and, in particular, polyurethane foams prepared by conventional techniques, i.e., the reaction of a polyether polyol or polyester polyol with an organic polyisocyanate in the presence of suitable catalysts, emulsifying agents, and foaming agents, are hydrophobic and quite stable when contacted with an aqueous solution. Consequently, conventional polyurethane foams have inherently limited utility in the construction of catamenial devices.

Various techniques and formulations have been developed to obtain polyurethane foams which are hydrophilic. Principal among these means are: impregnation of the foams with hydrophilic materials, such as polyvinyl alcohol and carboxymethyl cellulose, so as to impart a hydrophilic surface to the foams; incorporation of hydrophilic materials within the corpus of the polyurethane prior to foaming; and graft polymerization of hydrophilic materials, such as acrylates and acrylamides, onto the surface of the foams. Representative examples of such hydrophilic foams are found in the following U.S. patents: 3,457,203; 2,965,584; 3,149,000; 2,900,278; 3,382,090; and 2,990,378. While foams obtained by these various techniques possess excellent hydrophilic character, they are of limited utility with respect to the manufacture of sewerage disposable articles because the strength of these foams is unaffected by water.

Water-sensitive or water-destructable polyurethane foams have been prepared. For example, German Pats. 1,441,365; 1,109,364; and 1,208,881 disclose foams which are alleged to be suitable for the manufacture of sewerage disposable catamenial devices. However, these foams achieve water sensitivity at the expense of inherent tensile and tear strengths, and are obtained essentially by empirical methods of blending reactants and inert ingredients in such a manner that on contact with water the foam is physically disrupted rather than chemically cleaved as in the case of controlled hydrolysis at critical structural points along the length of a given polymeric chain.

Accordingly, an object of the present invention is to provide polyurethane plastics which are inherently hydrolytically unstable, and thus susceptible to hydrolytic degradation under selected conditions at controlled rates.

A second object of the present invention is to provide hydrolytically unstable polyurethane foams, and in particular to provide polyurethane foams which are hydrophilic, soft and resilient with good tensile and tear strengths when dry as well as wet, but which readily disintegrate into minute particles when subjected to aqueous waste treatment procedures.

SUMMARY OF THE INVENTION

Hydrophilic, hydrolytically unstable polyurethane foams are obtained by reacting an organic polyisocyanate with an active hydrogen-containing hydrolytically unstable polyester which comprises the reaction product of a polycarboxylic acid selected from the group consisting of oxalic, malonic, chloromalonic, oxomalonic, oxydiacetic, maleic, fumaric, and acetone dicarboxylic and a hydroxyl-containing compound selected from the group consisting of polyhydric alcohols, polyether polyols, amino alcohols, and polyester polyols. Such alcohols are generically termed "aliphatic polyhydric alcohols" for purposes of defining this invention.

These hydrolytically unstable polyurethane foams have all of the advantages of conventional hydrophilic foams, that is, high tensile strength, softness, resilience, and high capacity for water absorption; but are completely destructible when subjected to aqueous waste treatment procedures in that the foam is hydrolytically broken down into minute, heavier than water particles. These properties are ideally suited for the manufacture of catamenial devices and similar products which are destined for sewerage disposal.

DETAILED DESCRIPTION OF THE INVENTION

The hydrolytically unstable polyester polyols which can be used in preparing the novel foams of this invention are those which by reason of structure posses enhanced electrophilicity at the carbonyl carbon of the ester linkage. This enhancement of electrophilicity markedly increases the rate of hydrolysis, and is achieved when electron withdrawing structures are found near to or adjacent to a particular carbonyl carbon of the polyester polyol. For example, polyester polyols prepared from oxalic acid and a glycol such as ethylene glycol or diethylene glycol are quite labile with respect to hydrolysis of the ester linkage. Other dibasic carboxylic acids which yield hydrolytically unstable polyester polyols include malonic, chloromalonic, oxomalonic, oxydiacetic, maleic, fumaric, and acetone dicarboxylic. Also, the structure of the alcohol moiety can influenece the rate of hydrolysis of the ester linkages in the polyester polyol so prepared. For example, alcohols facilitating hydrolysis include ethylene glycol, chloroethylene glycol, 2-butene 1,4-diol, 1,3-dihydroxy-2-propanone, and hexafluoroacetone hydrate. Other combinations of alcohols and dibasic acids can be envisioned by those skilled in the art to yield polyester polyols which have the property of hydrolytic instability and therefore would be equivalent to the polyester polyols above enumerated. Also equivalent are amino-containing hydrolytically unstable polyesters; for the only requirements of these polyesters are that they: (1) be readily hydrolyzable under the conditions likely to be encountered in aqueous waste treatment procedures, but sufficiently stable to impart and preserve the structural integrity of the foamed product within the range of conditions likely to be encountered during use; and (2) that the polyester possess active hydrogen-containing groups (e.g., hydroxyl, amino) so that, in reaction with the isocyanate, structurally significant urethane or urea linkage can be formed.

The most preferred hydrolytically unstable polyester polyols have been found to be the esterification products of oxalic, malonic, oxomalonic, maleic, oxydiacetic, fumaric, and acetone dicarboxylic acids, respectively, with polyoxyalkylene glycols, such as polyoxyethylene glycol, polyoxypropylene glycols, polyoxypropylene-polyoxyethylene glycol copolymers, polyoxytetramethylene glycol, polyoxyalkylene triols (as prepared by the base-catalyzed reaction of propylene oxide or ethylene oxide with low molecular weight triols such as trimethylolpropane, glycerol, and 1,2,6-hexanetriol, as described in U.S. Pats. 2,674,619; 2,948,757; and 2,732,392); and with nitrogen-containing polyether polyols derived from alkylene oxides and polyamines, and alkylol amines as described in U.S. Pats. 2,674,619 and 2,697,118; and with polyalcohols such as ethylene glycol, diethylene glycol, glycerol, sorbitol, triethanolamine, di-(β-hydroxyethyl) ether; and with amino alcohols such as ethanolamine, 3-aminopropanol, 4-aminopropanol, and 6-aminohexanol, respectively. Of the above-mentioned polyoxalkylene glycols, many are commercially available and known by established trade names, for example: Dow SA-1421 Polyol (Down Chemical Company), polyoxypropylene glycols such as Niax Diol (Union Carbide Chemicals), Pluracol P (Wyandotte Chemicals), Voranol series, such as, Voranol CP 1500, CU 2921, CP 3000, CP 3720, CP 4000, and RA 700 (Dow Chemical), Poly-G (Olin-Matheson), Fomrez ED (Witco Chemicals), and polyoxypropylene-polyoxyethylene glycol polymers, such as Pluronic (Wyandotte Chemicals), polyoxypropylene adducts of glycerine such as Niax Triol LG (Union Carbide Chemicals), Pluracol GP (Wyandottee Chemicals), Triol G (Jefferson Chemical), Fomrez ET (Witco Chemicals, polyoxypropylene-polyoxyethylene adducts of propane known as Pluracol TP from Wyandottee Chemicals, polyoxypropylene-polyoxyethylene addults of trimethylolpropane known as Pluracol TPE from Wyandottee Chemicals, polyoxypropylene adducts of 1,2,6-hexanetriol known as Niax Triol LHT from Union Carbide Chemicals, polyoxypropylene adducts of pentaerythritol known as Pluracol PeP from Wyandotte Chemicals, polyoxypropylene adducts of sorbitol, such as Pluracol SP from Wyandotte Chemicals. Again it must be emphasized that an entire range of suitable hydrolytically unstable polyester polyols are available which meet the requirements above-indicated.

The other reaction components, in addition to the hydrolytically unstable polyester polyols, to provide the present polyurethane foams will of course be an organic isocyanate compound, a variable amount of a hydrolytically stable polyether or polyester polyol, plus catalysts, emulsifying agents and foaming agents. All of these, save the hydrolytically unstable polyester polyols are, conventional reaction components in the production of polyurethane foams.

For example, any of the organic polyisocyanates, polyisothiocyanates, or isocyanate-isothiocyanates that have been previously proposed for the preparation of polyurethane resins may be employed in preparing the present product invention. The polyioscyanates, because of their greater reactivity and commercial availability, are preferred; representative examples of this class are 2,4-toluene diisocyanate, 2,6-toluene diisocyanate, m-phenylene diisocyanate, 4 - chloro-1,3-phenylene diisocyanate, 1-chloro-phenylene 2,4-toluene diisocyanate, and naphthalene 1,5-diisocyanate. Representative examples of non-aromatic polyisocyanate suitable for preparation of the present hydrolytically unstable foams are tetra-, hexa-, and octamethylene diisocyanates. These and other isocyanate compounds useful herein are fully disclosed in U.S. Pat. 2,764,565, which is incorporated by reference.

The hydrolytically stable, active hydrogen-containing polymeric organic substances suitable for blending with the above-described hydrolytically unstable polyester polyols may be selected from a wide variety of polyfunctional compounds, including the above-mentioned polyoxyalkylene glycols, polyamines, polyalcohols, amino alcohols, polyamides, polythiols, polysulfonamides, and polyhydroxy esters such as the commercially available Multron R-68, R-70, and R-18 from Mobay Chemical Company, and Foamrez 50 from Witco Chemical Company. These and other suitable active hydrogen-containing polymeric organic substances are fully disclosed in U.S. Pats. 2,965,584 and 2,764,585, which are hereby incorporated by reference.

In addition to the principal ingredients of the reaction mixture described above, minor amounts of surfactants and catalysts are used to achieve the desired foaming properties when a reaction mass is contacted with a foaming agent, which is typically water. Among the surfactants that have been found useful are liquid nonionic emulsifiers which are mixtures of polyalcohol carboxylic acid esters and sodium salts of organic sulfonates sold under the trade names Witco 77–86 and Emcol H–77, and silicone surfactants such as Union Carbide's L–532 and L–540. Liquid ionic emulsifiers such as mixtures of alkyl urea polyether polyols and organic sulfonates sold under the trade names of Triton X–151 and Triton X–171 can also be used. Catalysts useful in the preparation of the present product invention include tertiary amines such as Dabco (1,4-diaza[2.2.2]-bycyclooctane from Houdry Process Company), and tin compounds such as stannous octoate, stannous oleate, dibutyltin dioctoate, and dibutyltin dilaurate.

Polyurethane foamed structures can be prepared in one of three different ways: the "one-shot," the "prepolymer," or the "quasi-prepolymer" method. In the "one-shot" technique, the basic ingredients, enumerated above, are mixed together and immediately polymerized and foamed. In the "prepolymer" technique, the polyol and the polyisocyanate are mixed in such proportions as to produce a polyurethane product which requires only the addition of a foaming agent and, in some cases, a chain extending or cross-linking agent. The "quasi- or semi-prepolymer" technique employs a reaction of the polyol and the polyisocyanate in which one or the other is used in excess, so that the resulting prepolymer contains an excess of reactive hydroxy or isocyanate group. Foaming and further condensation occur upon addition of more polyol or polyisocyanate, depending upon the reactive groups present in the prepolymer.

In general the foams of this invention are prepared by the "one-shot" method in which all ingredients are simultaneously mixed and allowed to foam within a molding device. The temperature of reaction is adjusted to obtain a suitable viscosity of the reaction mass for uniform foaming. The resulting foams can be cured at ambient temperatures or at elevated temperatures ranging from about 60° C. to 200° C. The process can be batch-wise or continuous; such processes are well known and are fully described in U.S. Pat. 3,338,090, which is hereby incorporated by reference. The resulting foams of this invention are generally characterized by their open cellular structure.

The following examples will clearly demonstrate both the manner in which these novel polyurethane foams are made, and also, by appropriate testing procedures demonstrate the novel properties of these foams.

EXAMPLE I

Preparation of representative hydrolytically unstable polyester polyols (A) A polyoxylate polyol was made by reacting 950 grams of diethyl oxylate with 827 grams of diethylene glycol in the presence of 0.53 gram of calcium oxide as catalyst. The reaction mixture, which was continually purged with dry nitrogen was heated initially to 110° C., and to 200° C. at the terminus of the reaction which was marked by the absence of ethanol in the purge gas. The resulting polyol had an average equivalent weight (atomic weight of hydroxyl:weight fraction hydroxyl in polyol) of 790.

(B) A polyoxylate was made by reacting 25.3 grams of diethyl oxylate with 1834 grams of Dow SA-1421 polyether, a triol of equivalent weight 1760, in the presence of 0.5 gram calcium oxide catalyst. Reaction conditions were the same as in Example I(A) except that the reaction products were vacuum stripped of low boiling materials of 110-200° C. at 12 mm. Hg. The resulting polyoxalate polyol had an equivalent weight of 2390.

As in Example I(A) or Example I(B), similarly useful hydrolytically unstable polyester polyols are obtained when the acid or its simple ester is replaced by either oxomalonic, oxydiacetic, maleic, fumaric, or acetone dicarboxylic acid, respectively, and the alcohol is replaced by either ethylene glycol, chloroethylene glycol, 2-butene-1-4-diol, 1,3-dihydroxy - 2 - propanone, polyoxypropylene glycol (Pluracol P, Wyandotte Chemicals), polyoxypropylene adducts of glycerine (Pluracol GP), polyoxypropylene adducts of pentaerythritol (Pluracol P2P), or polyoxypropylene adducts of sorbitol (Pluracol SP), respectively.

(C) A polyoxylate was made by reacting 523 grams of diethyl oxylate with 1404 grams of Carbowax 300 (a polyethylene glycol, from Dow Chemical Company of average molecular weight 300) in the presence of 5.78 grams of calcium oxide catalyst. The reaction conditions of Example I(B) were followed. The resulting polyoxalate polyol had an equivalent weight of 630.

(D) A polyoxylate was made by reacting 1279 grams of diethyl oxylate with 682 grams of glycerine in the presence of 5.88 grams of calcium oxide catalyst. The reaction conditions of Example I(B) were followed. The resulting polyoxalate polyol had an equivalent weight of 700.

(E) A polymalonate was made by reacting 1024 grams of diethyl malonate with 861 grams of diethylene glycol in the presence of 5.52 grams of calcium oxide catalyst. The reaction conditions of Example I(B) were followed.

EXAMPLE II

Preparation of polyurethane foams containing varying amounts of representative hydrolytically unstable polyester polyols In all cases the "one-shot" method was employed wherein the ingredients were thoroughly mixed and allowed to foam in molds. After appropriate curing the foams were subjected to the tests as detailed. These tests of the physical properties of the foams conform to those described by ASTM Methods DI564-62T (1962 Supplement to Book of ASTM Standards, part 9, ASTM Designation: E6-62, Philadelphia, Pa.), and show that the resulting foams are soft, resilient and possess a high capacity for absorption of aqueous fluids. Fluid absorptive capacity determinations were performed using a fluid similar to blood; such a synthetic blood was of the formulation (weight percentages): 88.24 distilled water, 1.00 NaCl, 0.40 $Na_2CO_3$, 10.00 glycerine, 0.46 CMC. For the determination, the foam was placed in a fluid confining zone and the hydrostatic head of the synthetic blood fluid was rapidly fluctuated from 6 to 16". The absorptive capacity under such conditions was found to be from 5-7 grams of fluid per gram of foam.

Further, by consequence of the incorporated hydrolytically unstable esters, these foams undergo a dramatic change in tensile and tear strengths on placement in sewage. Initially, the foams possess a tensile strength of from 5-12 p.s.i., which is sufficiently robust for the absorptive material element of articles designated for hygienic care. However, after a residence time of from 3-30 days in sewage, the tensile strength drops to a value of from 3.5-1.0 p.s.i.; foams of such tensile rapidly disintegrate into minute particles when the surrounding aqueous solution is moderately agitated. This loss in tensile was observed in both aerobic and anaerobic sewerage systems, thus the instant foams are functional in septic tank systems and municipal aerobic sewerage systems.

The following foams were prepared according to the indicated formulations. Apart from the emulsifying agents the catalysts, the formulations are based upon the following relationship:

$$\frac{\text{Grams ISOCY}}{\text{Equivalent wt. ISOCY}} = \frac{\text{Grams HS}}{\text{Equivalent wt. HS}} + \frac{\text{Grams HUS}}{\text{Equivalent wt. HUS}} + \frac{\text{Grams water}}{\text{Equivalent wt. water}}$$

where ISOCY is the particular isocyanate taken (when ISOCY is toluene diisocyanate the equivalent weight is 87), HS is the particular hydrolytically stable active hydrogen-containing reactant (the preferred HS reactants of this invention are the above-listed polyols), HUS is the particular hydrolytically unstable active hydrogen-containing reactant (the preferred HUS reactnts of this invention are the above-listed hydrolytically unstable polyester polyols), and the water taken in the formulation is the foaming agent which has an equivalent weight of 9 when ISOCY is a diisocyanate. The equivalent weight of a polyol is equal to its molecular weight divided by the number of reactive hydroxyl groups on the molecule, or, otherwise expressed, is the atomic weight of hydroxyl (17) divided by the weight fraction hydroxyl in a given weight of the polyol. The instantly preferred foams are formulated such that the mass ratio $$HUS/HUS+HS=0.2-1.0.$$

The above overall relationship is useful as a guide, it being understood that exact stoichiometric balance is not required. Thus, so-called under indexed foams are encompassed by this invention where HS or HUS are singly or collectively present at up to 10% excess of the stoichiometric amount.

(A)

| Component: | Parts by weight |
|---|---|
| Dow SA-1421 polyol | 65.0 |
| Toluene di-isocyanate (Mobay Mondur TD 80 80% 2,4 isomer, 20% 2,6 isomer) | 42.3 |
| Polyester of Example I(A) | 25.0 |
| N-ethylmorpholine | 0.10 |
| Stabilized stannous octoate | 0.30 |
| L-532 (Union Carbide silicone surfactant) | 2.0 |
| Tetronic 702 (Wyandotte Tetrol) | 10 |
| Water | 3.0 |

The resulting foam had a density ranging from about 1.8 to about 2.6 lb./ft.³ and exhibited the following relationship of wet tensile strength as a function of length of time in sewage.

| Time (days): | Wet tensile in anaerobic sewage, p.s.i. |
|---|---|
| 0 | 7.0 |
| 3 | 2.2 |
| 10 | 1.7 |
| 30 | [1] 1.2 |
| 60 | — |

[1] Three of the six samples had completely disintegrated at 30 days.

Samples of this foam when immersed in boiling water for 24 hours disintegrated into particles none greater than 1/16" in diameter. The absorptive capacity of this foam was about 6.9 grams of the above-described synthetic blood per gram of foam. Conventional foams do not possess these properties. As a comparative test, a foam was prepared identical to that of Example II(A) except that 25 parts by weight of the Dow SA-1421 polyol was substituted for the hydrolytically unstable polyester. The resulting foam had not visibly deteriorated after four months in either anaerobic or aerobic sewage.

(B) A foam was prepared with 50 parts by weight of the hydrolytically unstable polyester of Example I(A).

| Component: | Parts by weight |
|---|---|
| Dow SA-1421 polyol | 35.0 |
| Toluene di-isocyanate (Mobay Mondur TD 80) | 43.6 |
| Polyester of Example I(A) | 50.0 |
| Water | 3.0 |
| N-ethylmorpholine | 0.05 |
| Stabilized stannous octoate | 0.30 |
| L-532 (Union Carbide silicone surfactant) | 2.0 |
| Tetronic 702 (Wyandotte Tetrol) | 15 |

The resulting foam had an absorptive capacity of 6.9 grams synthetic blood per gram of foam and had a density of about 1.8 to 2.6 lbs./ft.$^3$, and exhibited the following change in wet tensile with length of time in sewage:

| Time (days) | 0 | 3 | 10 | 30 |
|---|---|---|---|---|
| Wet tensile in aerobic sewage, p.s.i. | 6.0 | 2.9 | 1.9 | 1.4 |
| Wet tensile in anaerobic sewage, p.s.i. | 6.0 | 3.3 | 1.8 | 1.6 |

(C) A foam was prepared with 30 parts by weight of the hydrolytically unstable polyester of Example I(C).

| Component: | Parts by weight |
|---|---|
| Dow SA-1421 polyol | 70 |
| Toluene di-isocyanate (Mobay Mondur TD 80) | 35.1 |
| Polyester of Example I(C) | 30.0 |
| Water | 3.0 |
| N-ethylmorpholine | 0.075 |
| Stabilized stannous octoate | 0.30 |
| L-532 (Union Carbide silicone surfactant) | 4.0 |

The resulting foam had a density of 2.0 lbs./ft.$^3$ with an absorptive capacity of 6.2 grams synthetic blood per gram of foam, and showed the following loss of tensile strength with time.

| Time (days): | Wet tensile in anaerobic sewage, p.s.i. |
|---|---|
| 0 | 6.4 |
| 3 | 2.0 |
| 10 | 2.5 |
| 30 | 3.9 |

(D) A foam was prepared with 25 parts by weight of the hydrolytically unstable polyester of Example I(D).

| Component: | Parts by weight |
|---|---|
| Dow SA-1421 polyol | 75 |
| Toluene di-isocyanate (Mobay Mondur TD 80) | 43.7 |
| Polyester of Example I(D) | 25 |
| Water | 3.0 |
| N-ethylmorpholine | 0.15 |
| Stabilized stannous octoate | 0.15 |
| L-532 (Union Carbide silicone surfactant) | 1.0 |

The resulting foam had a density of 2.0 lbs./ft.$^3$ with an absorptive capacity of 5.2 grams synthetic blood per gram of foam and showed the following losses in tensile strength with time.

| Time (days): | Wet tensile in anaerobic sewage, p.s.i. |
|---|---|
| 0 | 7.1 |
| 3 | 3.4 |
| 10 | 1.5 |
| 30 | 1.1 |

(E) A foam was prepared from the hydrolytically unstable polyester of Example I(C)

| Component: | Parts by weight |
|---|---|
| Toluene di-isocyanate (Mobay Mondur TD 80) | 44.4 |
| Polyester of Example I(C) | 100.0 |
| Water | 3.0 |
| Stabilized stannous octoate | 0.30 |
| L-532 (Union Carbide silicone surfactant) | 5.0 |

This foam completely disintegrated after 15 days in anaerobic sewage.

Catamenial devices manufactured from the hydrolytically unstable polyurethane foams of the instant invention exhibit high adsorptive capacity for bodily discharges and do not exhibit any significant structural deterioration while saturated with these fluids.

EXAMPLE III

Catamenial tampon devices are made from the foam of Example II(A) in accordance with copending, commonly assigned applications of B. A. Dulle, Ser. No. 172,694, filed Aug. 18, 1971, and J. E. Schaefer, Ser. No. 254,004, filed May 17, 1972. These tampons are soft and resilient with high absorptive capacity. They maintain adequate tensile and tear strengths throughout use, however on subjecting these catamenial devices to aqueous waste treatment procedures they disintegrate as detailed above for the exemplary foams.

What is claimed is:

1. A polyurethane foam, which is hydrolytically unstable under the conditions encountered in aqueous sewage treatment procedures, consisting essentially of the reaction product of an organic polyisocyananate, a blend of a hydrolytically stable polyol and a hydrolytically unstable polyester polyol, and a foaming agent; where said hydrolytically unstable polyester polyol is the esterification product of an aliphatic polyhydric alcohol and a polycarboxylic acid selected from the group consisting of oxalic, malonic chloromalonic, oxomalonic, maleic, fumaric, and acetone dicarboxylic; and where the ratio of the mass of said hydrolytically unstable polyester polyol to the combined mass of said hydrolytically stable polyol and said hydrolytically unstable polyester polyol is from 0.2 to 1.0.

2. The product of claim 1 wherein said foaming agent is water.

3. The product of claim 1 where said organic polyisocyanate is selected from the group consisting of 2,4-toluene diisocyanate, 2,6-toluene diisocyanate, m-phenylene diisocyanate, naphthalene 1,5-diisocyanate, and tetramethylene diisocyanate.

References Cited

UNITED STATES PATENTS

| 2,965,584 | 12/1960 | Elkin | 260—2.5 AD |
| 2,642,403 | 6/1953 | Simon | 260—2.5 AN |
| 3,457,203 | 7/1969 | Cohen | 260—2.5 AD |

FOREIGN PATENTS

| 1,208,881 | 1/1966 | Germany | 260—2.5 AD |

DONALD E. CZAJA, Primary Examiner

C. W. IVY, Assistant Examiner

U.S. Cl. X.R.

128—285; 260—2.5 AD, 2.5 AV